Dec. 19, 1961 L. D. STEVENS 3,014,203

INFORMATION STORAGE MATRIX

Filed Oct. 14, 1955 2 Sheets-Sheet 1

INVENTOR.
LOUIS D. STEVENS

BY Lippincott & Smith

ATTORNEYS

Dec. 19, 1961 L. D. STEVENS 3,014,203

INFORMATION STORAGE MATRIX

Filed Oct. 14, 1955 2 Sheets-Sheet 2

INVENTOR.
LOUIS D. STEVENS
BY Lippincott & Smith
ATTORNEYS

United States Patent Office 3,014,203
Patented Dec. 19, 1961

3,014,203
INFORMATION STORAGE MATRIX

Louis D. Stevens, San Jose, Calif., assignor to International Business Machines Corporation, New York, N.Y., a corporation of New York Filed Oct. 14, 1955, Ser. No. 540,532
3 Claims. (Cl. 340—173)

Figure 1:
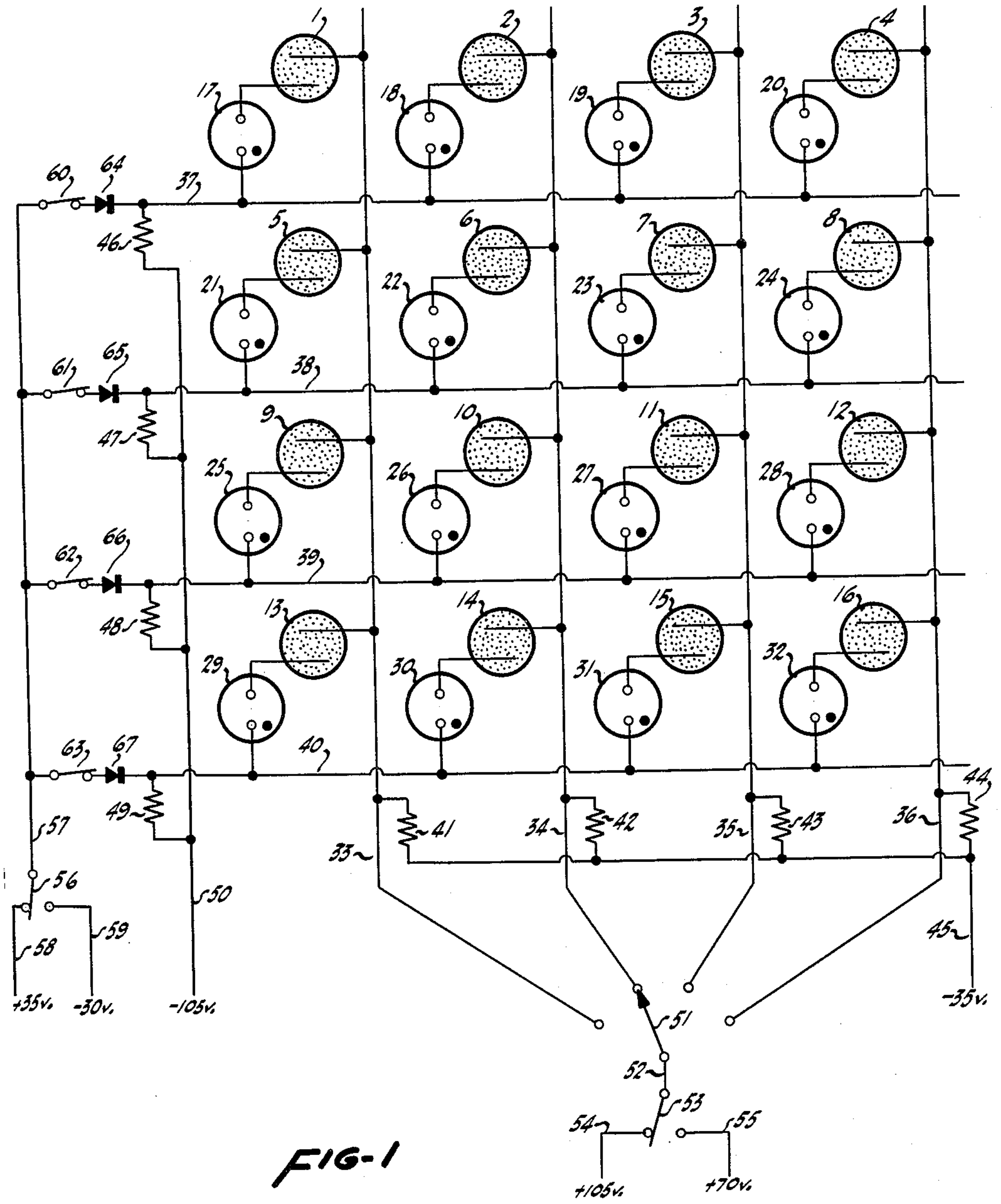

This invention relates to storage matrices for storing binary information, and in particular to such matrices utilizing coherers as storage devices.

Information storage matrices have previously been devised using various devices as binary storage elements. In a matrix storing large quantities of information, a correspondingly large number of binary storage elements is required, and the cost is substantial. An object of this invention is to provide a low-cost information storage matrix.

Coherers are essentially binary storage elements, since they have an initially high electrical resistance that is reduced to a relatively low value when the coherer is "fired" by application of a voltage above a critical value. The resistance then remains low until the coherer is restored to its initial condition, by mechanical shock, for example. Furthermore, coherers can be manufactured at low cost, and electrical connections thereto can be made economically by well-known printed circuit techniques and the like. However, use of coherers in a simple, low-cost information storage matrix is complicated by their lack of polarity—that is, they can be "fired" with equal ease by voltages of either polarity. Consequently, "back circuits" in the matrix through previously "fired" coherers may "fire" selected ones of the coherers and thus produce errors in the stored information. Accordingly, another object of this invention is to provide an information-storage matrix using coherers and having back-circuit elimination means for preventing the "firing" of selected ones of the coherers.

Other objects and advantages of the invention will appear as the description proceeds.

Briefly stated, in accordance with one aspect of this invention, an information-storage matrix has an array of coherers that serve as binary storage elements. An electrical impedor is connected in series with each coherer in such a way that back circuits are substantially eliminated. Various impedors may be used, preferred ones being glow lamps and diode rectifiers.

The invention will be better understood from the following description taken in connection with the accompanying drawings, and its scope will be pointed out in the appended claims. In the drawings, FIG. 1 is a circuit diagram illustrating one embodiment of this invention, and FIG. 2 is a circuit diagram illustrating another embodiment of this invention.

Figure 2:
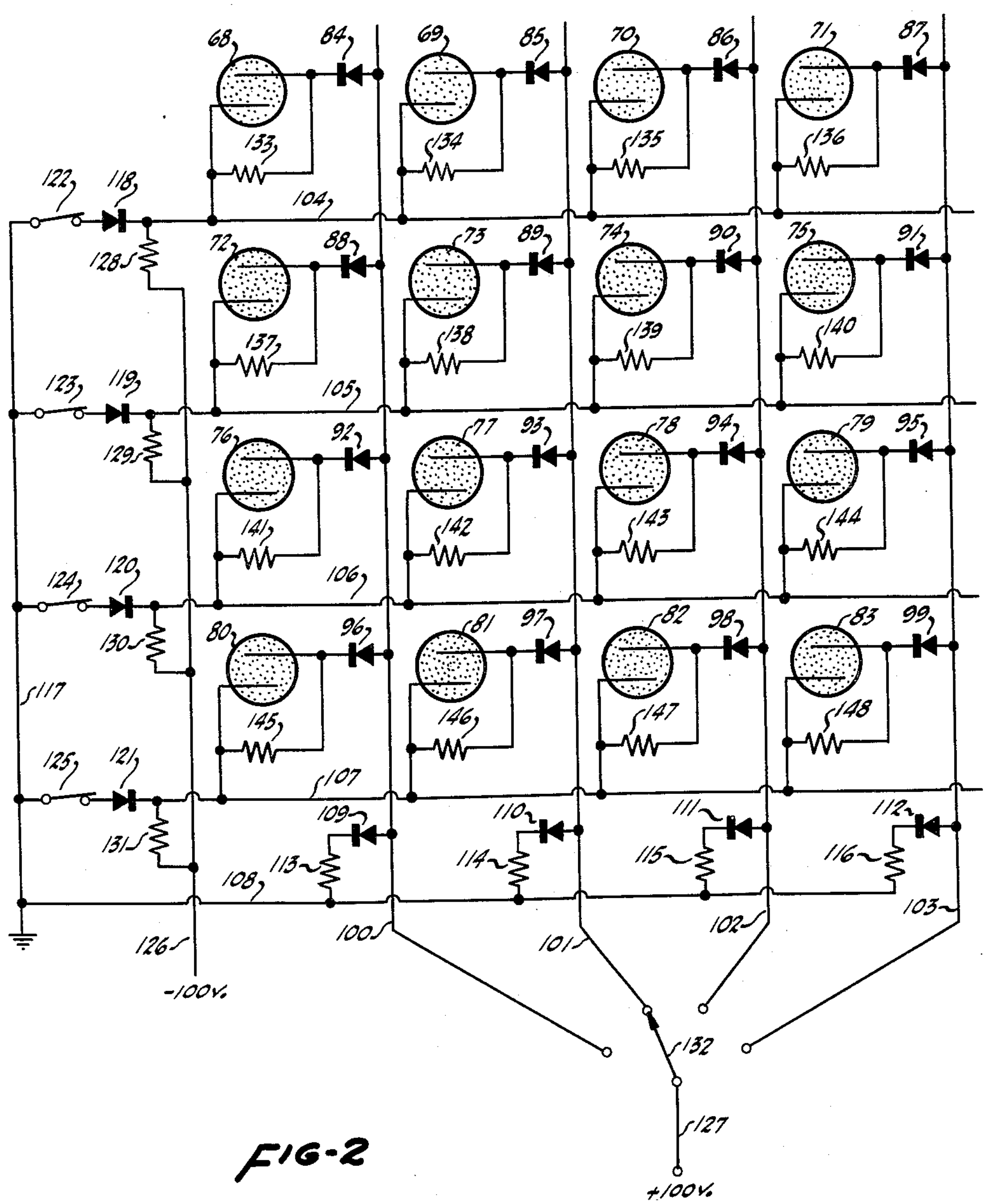

Referring now to FIG. 1, a plurality of coherers, identified in the drawings by reference numerals 1 through 16, inclusive, are arranged in an array of rows and columns, as shown. Each coherer consists of two electrodes immersed in a loose metallic powder. For example, the electrodes may be two mutually parallel circular brass plates each about three-sixteenths inch in diameter spaced about 35 mils apart. The space between the two electrodes may be filled with loose bronze powder. Such a coherer has a critical or "firing" voltage with a value between 100 and 200 volts.

In the initial condition of the coherer, the bronze powder has a high electrical resistance, and little if any electric current flows between the two electrodes. The coherer remains in this initial or high-resistance condition so long as any voltage applied between the two electrodes is less than the critical value—less than 100 volts, for example. Whenever a voltage having a magnitude greater than the critical value (100 volts) is applied between the two electrodes, the coherer "fires" or becomes operatively conductive, remaining in this condition until the bronze powder is mechanically disturbed sufficiently to break the bonding between particles of the aforesaid powder. While in its "fired" condition the coherer's resistance is materially reduced so that potentials much less than the critical value (100 volts) will cause a substantial current to flow between the two electrodes. Normally the "firing" potential employed is of the magnitude of 200 volts or more in order to obtain rapid and positive "firing" action.

A plurality of glow lamps, which may be conventional type NE2 neon lamps, are identified in the drawings by reference numerals 17 through 32, inclusive. One glow lamp is connected in series with each coherer, as shown, to form sixteen binary storage units each consisting of a coherer and a glow lamp connected in series.

The matrix also includes a first plurality of electrically conductive lines numbered 33 through 36, and a second plurality of electrically conductive lines numbered 37 through 40. Each of the lines 33 through 36 is connected to one terminal of each binary storage unit in a respective one of the four columns of the array, and each of the lines 37 through 40 is connected to the other terminal of each binary storage unit in a respective one of the four rows of the array, as shown. Lines 33 through 36 are connected through resistors 41 through 44 to a line 45 that is maintained at a bias potential of −35 volts by any suitable voltage-supply means, not shown. Consequently, a bias potential of −35 volts is normally supplied to all of the four lines 33 through 36. Lines 37 through 40 are connected through resistors 46 through 49 to a line 50 that is maintained at a bias potential of −105 volts.

A four-position switch 51 connects a line 52 to any one of the four lines 33 through 36, selectively. A two-position switch 53 connects line 52 to either of two lines 54 and 55, selectively. Line 54 is maintained at a potential of +105 volts, and line 55 is maintained at a potential of +70 volts, by any suitable voltage-supply means, not shown. Consequently, a positive potential of either 105 volts or 70 volts, depending upon the position of switch 53, is applied to a selected one of the lines 33 through 36, depending upon the position of switch 51.

A two-position switch 56 connects a line 57 to either of two lines 58 and 59, selectively. Line 58 is maintained at a potential of +35 volts, while line 59 is maintained at a potential of −30 volts, by any suitable voltage-supply means, not shown. Consequently, line 57 is maintained either at +35 or at −30 volts, depending upon the position of switch 56. Line 57 is connected to each of the lines 37 through 40 through a plurality of normally-closed switches 60 through 63 connected in series with diode rectifiers 64 through 67, as shown. Whenever switches 60 through 63 are closed, lines 37 through 40 are maintained at potentials at least as positive as the potential of line 57. When any of the switches 60 through 63 is open, the corresponding one of the lines 37 through 40 may drop in potential to the −105 volt potential of line 50.

Assume that all of the coherers are in the "unfired" or high-resistance condition, and that switches 53 and 56 are closed to the left as shown in the drawing, which is the switch position used to "read in" information to the matrix. Also assume that switch 51 is positioned to connect line 52 to line 33, thereby raising the potential of line 33 to +105 volts, that switches 60 and 62 are closed, thereby maintaining the potential of lines 37 and 39 at +35 volts, and that switches 61 and 63 are open so that the potential of lines 38 and 40 drops to −105 volts. The positions of switches 60 through 63 represent the binary information that is to be stored in the matrix, and the position of switch 51 indicates that this information is to be stored in the first matrix column.

Since the potential of line 33 is +105 volts, while the potential of line 38 is −105 volts, a voltage of 210 volts is applied across the binary storage unit comprising coherer 5 and glow lamp 21. While the coherer is "unfired" most of this voltage appears across the coherer, and since the voltage across coherer 5 exceeds its critical voltage, this coherer is "fired." Similarly, a voltage of substantially 210 volts is applied across coherer 13, and this coherer is also "fired." It may be noted that no other coherer in the matrix has applied thereto a voltage as great as 100 volts. Consequently, only coherers 5 and 13 are "fired" at this time. Accordingly, in the first column of the matrix there have been "fired" two coherers that correspond to the open ones of switches 60 through 63, thereby storing in the first column of the matrix the desired binary information.

In a similar way, binary information may be stored in the other matrix columns. For example, assume that switch 51 now connects line 52 to line 34, that switches 61 and 62 are closed, and that switches 60 and 63 are open. Voltages of substantially 210 volts are applied across coherers 2 and 14, and these two coherers are thus "fired" to store binary information in the second matrix column.

The problem of back circuits and the function of glow lamps 17 through 32 will now be considered. When conducting current, each of the glow lamps provides across its terminals a substantially constant voltage drop of about 70 volts. These voltage drops have the effect of isolating the coherers from one another and prevent the undesired firing of unselected coherers in a manner that will now be explained. The voltage drops across the glow lamps also prevent the production of false "readout" signals through back circuits when the stored information is "read out" in a manner hereinafter described.

Consider what would happen if the glow lamps were replaced by direct circuit connections. Assume that switch 51 connects line 52 to line 33, and that switches 61 and 63 are open. Substantially 210 volts is applied across the selected coherers 5 and 13, as hereinbefore explained, and these two coherers are "fired." The resistance of coherers 5 and 13 then drops to a very low value, so that coherers 5 and 13 become essentially short circuits. If glow lamps 21 and 29 were replaced by direct circuit connections, lines 38 and 40 would then be raised to a potential of substantially +105 volts, and approximately 140 volts would be applied across unselected coherers 6, 7, 8, 14, 15 and 16. The voltage is substantially two-thirds as large as the normal "firing" voltage applied across selected coherers and has the opposite polarity, but since coherers are inherently insensitive to voltage polarity and have somewhat indefinite critical "firing" voltages, some or all of the unselected coherers 6, 7, 8, 14, 15 and 16 might be "fired" by a reverse voltage of 140 volts.

Even if none of the unselected coherers are "fired" at this time, difficulty might be encountered when information is "read in" to another column of the matrix. For example, assume that coherers 5 and 13 are in the "fired" condition, that switch 51 now connects line 52 to line 34, that switches 61 and 62 are closed, and that switches 60 and 63 are open. A "firing" voltage of 210 volts is applied across both the selected coherers 2 and 14. However, one of these coherers may "fire" slightly in advance of the other. Assume, for example, that coherer 14 "fires" first, and that all of the glow lamps have been replaced by direct circuit connections. As soon as coherer 14 "fires," line 40 would be raised to a potential of substantially +105 volts. Since coherer 13 is in the "fired" condition, it is essentially a short circuit and line 33 would also be raised to a potential of substantially +105 volts. "Firing" voltages of substantially 210 volts are now present across both the coherers 1 and 2, and it may be that the unselected coherer 1 will "fire" rather than the selected coherer 2.

In the circuit shown in FIG. 1, these back circuit difficulties are eliminated by the glow lamps 17 through 32. For example, assume that switch 51 connects line 52 to line 33, that switches 60 and 62 are closed, and that switches 61 and 63 are open. Coherers 5 and 13 are "fired" and become essentially short circuits, but glow lamps 21 and 29 each provides a voltage drop of approximately 70 volts, so that lines 38 and 40 are raised to a potential of only +35 volts. This is the same potential as that of the unselected lines 37 and 39, and none of the unselected coherers receives a voltage exceeding 70 volts, which is safely below the critical "firing" voltage of the coherers.

Now assume that coherers 5 and 13 remain in the "fired" condition, and that switch 51 is moved to connect line 52 to line 34 while switches 61 and 62 are closed and switches 60 and 63 are open. 210-volt "firing" voltages are applied across the selected coherers 2 and 14, and these two coherers are "fired." Assume that coherer 14 "fires" first. Line 40 is raised to a potential of +35 volts by current passing through coherer 14 and glow lamp 30. Since coherer 13 is in the "fired" condition, it is essentially a short circuit, but any current flowing from line 40 through coherer 13 must also flow through glow lamp 29 which provides a voltage drop of substantially 70 volts. Therefore, the potential of line 33 is not changed from its bias value of −35 volts, and none of the unselected coherers receive voltages in excess of 70 volts.

Thus it is apparent that the glow lamps effectively prevent the firing of unselected coherers through back circuits, and effectively isolate the coherers from one another. For best results, the "firing" voltage applied to selected coherers is made substantially three times the constant voltage drop across one of the glow tubes, and the coherers are so designed that the "firing" voltage of 210 volts is just above an upper critical voltage at which the coherers can always be fired reliably. The values of the bias voltages are selected so that the maximum voltage applied to any unselected coherer is only one-third the normal "firing" voltage, so that a three-to-one relation exists between "firing" and "non-firing" voltages. In other words, the 70 volts applied to unselected coherers is well below a lower critical voltage at which no coherer in the matrix will ever "fire." This allows for a wide variation in critical "firing" voltages of the coherers, and permits reliable operation of large information-storage matrices.

When previously stored information is to be "read-out" from the matrix, switches 53 and 56 are closed to the right so that lines 52 and 57 are maintained at potentials of +70 volts and −30 volts, respectively. All of the switches 60 through 63 remain closed, and switch 51 is adjusted to connect line 52 to a selected one of the lines 33 through 36 corresponding to the matrix column from which information is to be "read out." Assume, for example, that switch 51 connects line 52 to line 33, thereby raising the potential of line 33 to +70 volts. Also assume that coherers 5 and 13 are in the "fired" condition, while coherers 1 and 9 are in the "unfired" condition.

Since the unfired coherers have very high electrical resistances, they are substantially open circuits and lines 37 and 39 remain at the −30 volt bias potential of line 57. The "fired" coherers 5 and 13, however, are essentially short circuits, and current flows through these coherers and through glow lamps 21 and 29. Each glow lamp provides a voltage drop of approximately 70 volts, and lines 38 and 40 are raised substantially to zero potential. Consequently, the potentials of lines 37 through 40 represent the stored information, and these potentials may be supplied to any computing or "read-out" apparatus that is to receive this information. In a similar way, the stored information in each of the other columns can be "read out" by adjusting switch 51 to connect line 52 to the one of lines 33 through 36 corresponding to the column from which information is to be "read out."

Information can be stored in the matrix for any desired length of time, and can be "read out" whenever and as often as may be desired. When it is desired to erase the stored information, a mechanical shock is applied to the coherers by taping, shaking or otherwise agitating the bronze powder to break the small welds between adjacent powder grains. All of the coherers are then restored to the initial or "unfired" conditions, and other information may then be stored in the matrix whenever desired.

The matrix herein described can be used either in a series-operated or a parallel-operated computer system. In a series-operated system, four different four-place binary numbers are stored in each row of the matrix, and successive digits of each number are stored in successive columns of the matrix. In this case switch 51 is operated as a "break-before-make" sequencing switch, and during "read-in" operations switch 51 is moved successively to the right, one position at a time, at time intervals corresponding to the spacing in time between successive digits of a serially-represented binary number. While switch 51 is moving from one contact to the next, there is an interval when all of the contacts of switch 51 are open. During this interval, when all of the lines 33 through 36 are disconnected from line 52, the positions of switches 60 through 63 are changed in accordance with the next digit of each binary number to be stored in the matrix.

During "read-out" operations, switch 51 is similarly moved to the right in sequence from one position to the next, and successive electrical pulses are provided in leads 37 through 40 giving a serial representation of the four-place binary numbers stored in the matrix.

In parallel-operated systems, four different four-place binary numbers are stored in different columns of the matrix, and successive digits of each number are stored in successive rows in the matrix. In this case, during "read-in" operations switch 51 is positioned in accordance with the column in which a number is to be stored, while switches 60 through 63 are positioned in accordance with successive digits of this number. During "read-out" operations, whenever switch 51 is connected to a particular column, electric signals are provided in lines 37 through 40 that represent successive digits of the binary number stored in that column.

The matrix can also be used to convert from parallel to serial operation, and vice versa, by changing the "read-out" procedure. For example, assume that a serial "read-in" is employed as hereinbefore explained, so that four different four-place binary numbers are stored in the four rows of the matrix, while successive digits of each number are stored in successive columns of the matrix. If parallel "read-out" of these stored numbers is desired, switch 51 may be placed in an intermediate position between two of its contacts, whereby all of the lines 33 through 36 are disconnected from line 52 and therefore are biased to −35 volts. Assume that coherers 1 and 3 are in the "fired" condition while coherers 2 and 4 are "unfired," thus representing a four-place binary number stored in the first matrix row. Also assume that the potential of line 50 is changed to −35 volts, that the potential of line 59 is +70 volts, that switch 56 is closed to the right, thereby maintaining line 57 at a potential of +70 volts, and that switches 60 through 63 are all initially open.

Now close switch 60 for reading the four-place binary number stored in the first row of the matrix. Line 37 is raised to a potential of +70 volts. Since coherers 2 and 4 are in the "unfired" condition, they are essentially open circuits, and the potential of lines 34 and 36 remains at substantially −35 volts. The "fired" coherers 1 and 3, however, are essentially short circuits, and current flows through these coherers to lines 37 and 35. Glow lamps 17 and 19 each provide a voltage drop of substantially 70 volts, so that the potential of lines 33 and 35 is raised to substantially zero volts. Accordingly, the electric potentials of lines 33 through 36 provide a parallel-operation representation of the binary number stored in the first row in the matrix. By closing the switches 60 through 63 in sequence, the numbers stored in the four rows can be read out sequentially, each number being represented in parallel form by the potentials of lines 33 through 36.

The information-storage matrix illustrated in FIG. 1 comprises sixteen binary information storage units, each consisting of a coherer in series with a glow lamp, arranged in four rows and four columns for storing sixteen bits of binary information. However, the size of the matrix may be extended to any desired extent without departing from the inventive principles herein disclosed, and matrices capable of storing thousands of bits of binary information can readily be constructed.

For simplicity, switches 51 and 60 through 63 are represented as mechanical switches, which they may be in low-speed computing apparatus. In high-speed apparatus, electronic switches will generally be employed. It has been found that the coherers may be fired by voltage pulses of only ten to twenty microseconds duration, and consequently a reasonably high-speed storage matrix can be provided if electronic switching systems are used. The sequencing switch 51 may be replaced by an electric pulse generator, or a plurality of pulse generators, that supplies positive electric pulses sequentially to lines 33 through 36 at predetermined time intervals. Switches 60 through 63 may be switches operated by a keyboard or other computer input device, or they may be electronic gate circuits operated by the state of an electronic counting register.

A glow lamp in series with each coherer makes a very good back-circuit eliminator, as hereinbefore explained. However, because of cost considerations or other reasons, it may sometimes be desired to use other impedors rather than glow lamps. For example, in a very small matrix simple resistors may be used in place of glow lamps. For somewhat larger matrices, diode rectifiers may be employed in a manner that will now be described.

Referring now to FIG. 2 of the drawings, an information storage matrix comprises a plurality of coherers identified in the drawings by reference numerals 68 through 83, inclusive. A plurality of rectifiers, identified in the drawings by reference numerals 84 through 99, may be small selenium diodes that may be manufactured economically by printed circuit techniques, and therefore may be parts of low-cost printed circuits connected to the coherers. One diode rectifier is connected in series with each coherer, as shown, to form an array of binary storage units arranged in four rows and four columns. A first plurality of electrically conductive lines 100 through 103 are each connected to each binary storage unit in a respective column of the matrix, and a second plurality of electrically conductive lines 104 through 107 are each connected to each binary storage unit in a respective one of the four rows of the matrix.

The four lines 100 through 103 are respectively connected to the line 108 by rectifiers 109 through 112 and resistances 113 through 116, connected as shown. Line 108 may be connected to ground or its circuit equivalent. The four lines 104 through 107 are respectively connected to a line 117 by rectifiers 118 through 121 and normally closed switches 120 through 125, connected as shown. Line 117 may be connected to ground or its circuit equivalent. A line 126 is maintained at a constant potential of −100 volts, and a line 127 is maintained at a constant potential of +100 volts, by suitable voltage supply means, not shown. Line 126 is connected to lines 104 through 107 by a plurality of resistors 128 through 131. A four-position switch 132 connects line 127 to any one of the four lines 100 through 103, selectively, depending upon the switch position.

During a "read-in" operation for storing information in the matrix, switch 132 is positioned to connect line 127 to one of the lines 100 through 103 corresponding to the column in which the information is to be stored. Selected ones of the switches 122 through 125 are opened in accordance with the binary digits that are to be stored in that matrix column.

For example, assume that switch 132 is positioned to connect line 127 to line 100, and that switches 122 and 124 are open. The potential of line 100 is thus raised to +100 volts, while the potentials of lines 104 and 106 drop to −100 volts. Consequently, a voltage of substantially 200 volts is applied across coherers 68 and 76, and since this voltage is above the critical firing voltage for these coherers, the selected coherers 68 and 76 are "fired." Rectifiers 84 and 92 have a low forward resistance and therefore have little effect upon the "firing" of selected coherers. The largest voltage present at this time across any unselected coherer is 100 volts, and this is below the critical "firing" voltage of the coherers.

Now assume that switch 132 connects line 127 with line 101, that switches 122 and 123 are open, and that switches 124 and 125 are closed. "Firing" voltages of 200 volts are now applied across coherers 69 and 73, for "firing" these two selected coherers to store information in the second column of the matrix.

For an understanding of the rectifier functions, consider the circuit potentials at the time just before coherers 69 and 73 are "fired." Lead 101 is maintained at a potential of +100 volts through switch 132. Since switches 122 and 123 are open, the potentials of leads 104 and 105 drop to the −100 volt potential of lead 126. Since coherer 68 is in the "fired" condition, it is essentially a short circuit. Consequently, the potential of lead 100 drops to substantially the same value as the potential of lead 104, or −100 volts. The flow of current from lead 106 to lead 100 through "fired" coherer 76 is blocked by the high back resistance of rectifier 92, and the flow of current from lead 108 to lead 100 through resistor 113 is blocked by the high back resistance of rectifier 109. If it were not for rectifiers 92 and 109, lead 100 would be maintained substantially at ground potential, and a current would flow from line 100 through the "fired" coherer 68 that would prevent the potential of line 104 dropped sufficiently to "fire" the selected coherer 69.

"Firing" voltages are now present across both of the selected coherers 69 and 73. Assume that coherer 69 "fires" first. Coherer 69 becomes essentially a short circuit, and the potential of lead 104 is raised to substantially +100 volts. If rectifier 84 were short circuited, the potential of lead 100 might also be raised to substantially +100 volts, and a voltage of almost 200 volts would appear across an unselected coherer 72, that might cause the undesired "firing" of this coherer. In the circuit shown, however, the back resistance of rectifier 84 is large compared to the resistance to ground through rectifier 109 and resistor 113. Consequently, the potential of lead 100 rises only a slight amount above ground potential, and the voltage across coherer 72 is insufficient to "fire" this coherer.

Now assume that coherer 73 "fires" before coherer 69. As soon as coherer 73 "fires," the potential of lead 105 is raised to substantially +100 volts. Since lead 104 is still at a potential of −100 volts, and is connected to lead 100 through the "fired" coherer 68, the potential of lead 100 at this time is −100 volts. Consequently, a voltage of almost 200 volts is present across coherer 72 and diode rectifier 88 in series. However, this voltage is of the opposite polarity to the normal "firing" voltage, and therefore a portion of the 200 volts appears across the relatively high back resistance of the diode rectifier 88 and only the remaining portion appears across coherer 72. Consequently, coherer 72 will not be "fired" if the back resistance of rectifier 88 is large compared to the "unfired" resistance of the coherer.

Using high quality vacuum tube diodes, extremely high rectifier back resistances can be obtained. However, when for reasons of economy, ruggedness, and compactness, less expensive semi-conductor rectifiers, such as selenium rectifiers, are employed, the back resistance of the rectifier may be low compared to the unfired resistance of the coherer. To prevent a large proportion of reverse polarity voltages from appearing across the coherer in this case, and thus perhaps inadvertently "firing" an unselected coherer, shunt resistors 133 through 148 are connected in parallel with the coherers, as shown. The resistance of resistor 137, for example, is low compared to the back resistance of diode rectifier 88, and consequently a major portion of the reverse polarity voltage between lines 105 and 100 appears across the diode rectifier, and only a small portion of this voltage appears across coherer 72 and resistor 137 in parallel.

On the other hand, the resistance of resistors 133 through 148 is relatively high, in the order of several megohms, for example, in relation to the forward resistance of the diode rectifiers and also in relation to the "fired" resistances of the coherers. Consequently, the shunt resistors have no appreciable effect upon the operation of the circuit other than the prevention of excessive voltages of reverse polarity across "unfired" coherers. Resistors 133 through 148 may be made simply by providing leakage paths between the coherer electrodes, for example, by depositing a low conductivity conducting film or coating on the insulating walls of the coherer cell.

To "read out" information from this matrix, switches 122 through 125 remain closed while switch 132 is positioned to connect line 127 to a selected one of the lines 100 through 103 corresponding to the column from which stored information is to be "read out." For example, assume that switch 132 connects line 127 to line 100 for reading information stored in the first column of the matrix, that coherers 68 and 76 are in the "fired" condition, and that coherers 72 and 80 are in the "unfired" condition. Since coherers 72 and 80 are essentially open circuits, lines 105 and 107 remain substantially at ground potential. Coherers 68 and 76 are essentially short circuits, and consequently lines 104 and 106 are raised substantially to a potential of +100 volts. Consequently, the potentials of lines 104 through 107 represent the binary information stored in the first column of the matrix. To "read out" information from other matrix columns, it is only necessary to change the position of switch 132 to connect line 127 with an appropriate one of the lines 100 through 103.

It should be understood that this invention in its broader aspects is not limited to specific embodiments herein illustrated and described, and that the following claims are intended to cover all changes and modifications that do not depart from the true spirit and scope of the invention.

What is claimed is:

1. An information storage matrix comprising an array of two-terminal binary storage units arranged in rows and columns, each of said storage units consisting of a coherer that has a critical firing voltage connected in series with a glow discharge lamp that provides a constant voltage drop when it conducts current, said critical voltage being larger than said voltage drop and smaller than three times said voltage drop, a first plurality of electrically conductive lines each connected to one terminal of each storage unit in a respective one of said columns, a second plurality of electrically conductive lines each connected to the other terminal of each storage unit in a respective one of said rows, means biasing said first plurality of lines to a first electric potential relative to a ground potential and biasing said second plurality of lines to a second electric potential relative to a ground potential, said second potential being more positive than said first potential by an amount substantially equal to said voltage drop, means for applying to a selected line of said first plurality an electric potential more positive than said second potential by an amount substantially equal to said voltage drop, and means for applying to a selected line of said second plurality an electric potential more negative than said first potential by an amount substantially equal to said voltage drop, whereby a voltage greater than said critical voltage is applied across a selected one of said coherers while the voltages across all unselected ones of said coherers are maintained at values less than said critical voltage.

2. An information storage matrix comprising a first plurality of electrically conductive lines, a second plurality of electrically conductive lines, and a plurality of information storage units connecting each line of said first plurality of lines to each line of said second plurality of lines, each of said storage units being connected to only one line of said first plurality and to only one line of said second plurality, each of said storage units comprising a coherer and a glow discharge lamp connected in series.

3. An information storage matrix comprising a first plurality of electrically conductive lines, a second plurality of electrically conductive lines, and a plurality of information storage units connecting each line of said first plurality of lines to each line of said second plurality of lines, each of said storage units being connected to only one line of said first plurality and to only one line of said second plurality, each of said storage units comprising a coherer and a neon glow discharge lamp connected in series.

References Cited in the file of this patent

UNITED STATES PATENTS

| | | |
|---|---|---|
| 876,701 | Drewell | Jan. 14, 1908 |
| 2,709,042 | Couffignal | May 24, 1955 |
| 2,844,811 | Burkhart | July 22, 1958 |
| 2,928,080 | Auerbach | Mar. 8, 1960 |

FOREIGN PATENTS

| | | |
|---|---|---|
| 872,068 | Germany | Mar. 30, 1953 |

OTHER REFERENCES

Mellon Institute of Industrial Research, Quarterly Report #3 of the Computer of Industrial Research No. 347, Aug. 29, 1951, pp. III–1, III–7, FIGS. III–1, III–3.